A. R. B. MOSES.
HATS OR OTHER HEAD COVERINGS.

No. 272,147. Patented Feb. 13, 1883.

Witnesses
Otto Aufeland.
William Miller.

Inventor.
Abraham R. B. Moses
p' Van Santvoord & Hauff
Attys

UNITED STATES PATENT OFFICE.

ABRAHAM R. B. MOSES, OF NEW YORK, ASSIGNOR TO LIONEL MOSES, OF BROOKLYN, N. Y.

HAT OR OTHER HEAD-COVERING.

SPECIFICATION forming part of Letters Patent No. 272,147, dated February 13, 1883.

Application filed February 28, 1880.

*To all whom it may concern:*

Be it known that I, ABRAHAM R. B. MOSES, a citizen of the United States, residing at New York, in the county and State of New York, have invented new and useful Improvements in Hats or other Head-Coverings, of which the following is a specification.

This invention relates to certain improvements in hats of that class in which cork is made one of its component parts, made so, in some instances, by interposing a sheet of textile material between layers of cork, and in others by coating a layer of cork with a rubber compound upon which a sheet of textile or woven material is laid and caused to connect therewith by the application of a heated iron.

My invention consists in a head-covering the body of which is formed of a sheet produced by spreading between two layers of buckram or other suitable flexible and elastic material a mixture of a suitable cement with granulated or sliced cork, wood-shavings, moss, or other like material, said sheet, after having been completed, being exposed to the action of suitable dies and molds.

Figure 1:
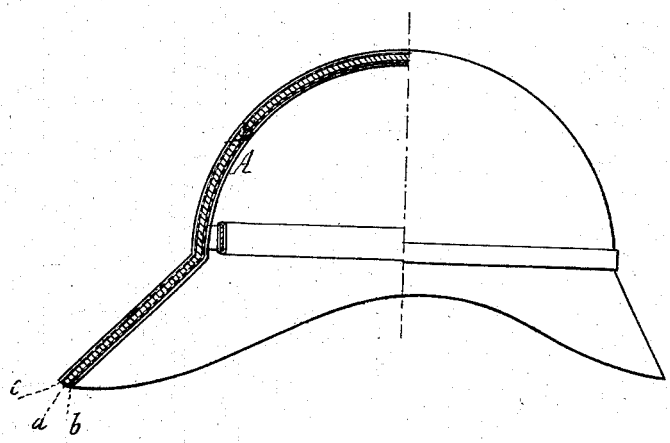
Figure 2:

This invention is illustrated in the accompanying drawings, in which Figure 1 represents a sectional side view of a head-covering made according to my invention. Fig. 2 is a section of a sheet from which the bodies of my head-coverings are formed.

Similar letters indicate corresponding parts.

In the example shown in the drawings the letter A designates a hat calculated for men's wear; but my invention is applicable to head-coverings of all kinds. The body of this hat or head-covering is formed of a sheet, B, Fig. 2, which is produced as follows: I take cork and granulate the same or cut it into fine slices, and add thereto a sufficient quantity of a solution of shellac or other adhesive material, adapted to agglomerate the granulated or sliced cork. Of this mixture I spread a layer, *a*, upon a sheet, *b*, of buckram or other like elastic and flexible material, and after placing upon the top of the layer *a* another sheet, *c*, of buckram, I expose the whole to pressure until the cement has set, and a sheet, B, of uniform thickness is obtained.

In order to produce a hat-body, I take one of the sheets B and place the same over a suitable mold and press it into the required form. In order to accomplish this operation successfully, it is requisite to soften the sheet B by the action of moisture or of heat, or of both combined, according to the nature of the cement used for agglomerating the cork, or the sheets B can be placed over the molds and pressed before the cement has become hard and dry.

In forming my sheets B, I can substitute for the granulated or sliced cork wood-shavings, moss, the pith of trees, or other material of a similar nature.

After the body A has been formed, as above described, I cover and line the same with silk, alpaca, muslin, or other suitable material, when the head-covering is ready for the market.

What I claim as new, and desire to secure by Letters Patent, is—

1. As a new manufacture, a head-covering made of two layers of flexible and elastic material, and an interior layer of pieces of cork or similar material cemented to each other and to the outside material, substantially as and for the purpose specified.

2. A head-covering or hat, A, made of two layers, *b b*, of buckram or other flexible and elastic material, and an interior layer, *a*, of pieces of cork or other similar material cemented to each other and to the outside layers, *b b*, pressed into the required form, substantially as above shown and described.

3. A head-covering or hat, A, made of two layers, *b b*, of buckram or other flexible and elastic material and an interior layer, *a*, of pieces of cork or similar material cemented to each other and to the outside layers, *b b*, pressed into the required form and covered and lined, substantially as above shown and described.

In testimony whereof I have hereunto set my hand and seal in the presence of two subscribing witnesses.

ABRAHAM R. B. MOSES. [L. S.]

Witnesses:
W. HAUFF,
E. F. KASTENHUBER.